United States Patent [19]

Shaw

[11] 3,905,144
[45] Sept. 16, 1975

[54] FISHHOOK LEADER STANDOFF
[76] Inventor: Robert F. Shaw, Marlton Lakes, Atco, N.J. 08004
[22] Filed: Jan. 11, 1974
[21] Appl. No.: 432,616

Related U.S. Application Data
[63] Continuation-in-part of Ser. No. 334,722, Feb. 22, 1973, abandoned.

[52] U.S. Cl. .............................................. 43/42.74
[51] Int. Cl.² ........................................ A01K 97/00
[58] Field of Search ............ 43/42.74, 43.15, 44.84, 43/44.85, 44.9

[56] References Cited
UNITED STATES PATENTS
2,202,976  6/1940  Wise ................................. 43/44.85
2,766,547  10/1956  Gallagher ......................... 43/42.74
2,929,168  3/1960  Furuto .............................. 43/44.84
3,550,305  12/1970  Santosuosso ...................... 43/42.74

Primary Examiner—Warner H. Camp
Attorney, Agent, or Firm—Charles F. Duffield

[57] ABSTRACT

A fishing line standoff is disclosed which permits horizontal positioning of the fishhook and leader and includes a vertically extending base member with an axial passageway therethrough and an integrally formed horizontally extending arm member further including a second passageway therethrough.

5 Claims, 3 Drawing Figures

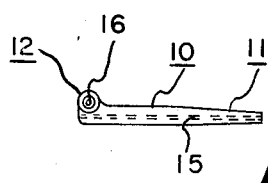
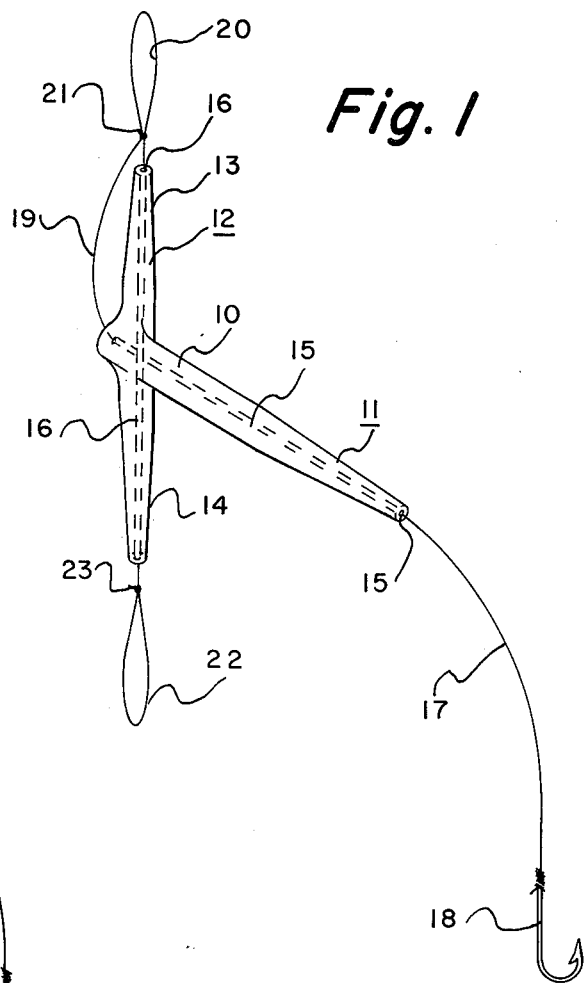
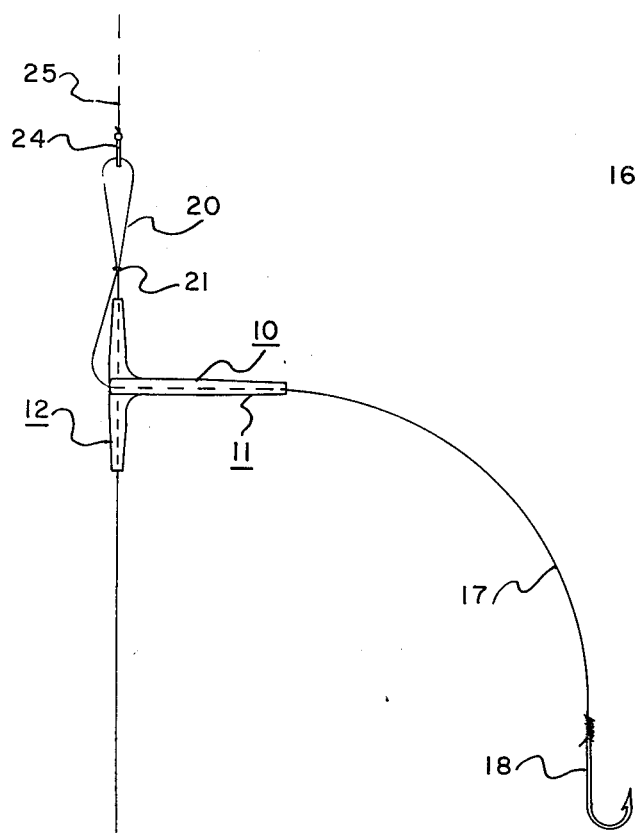
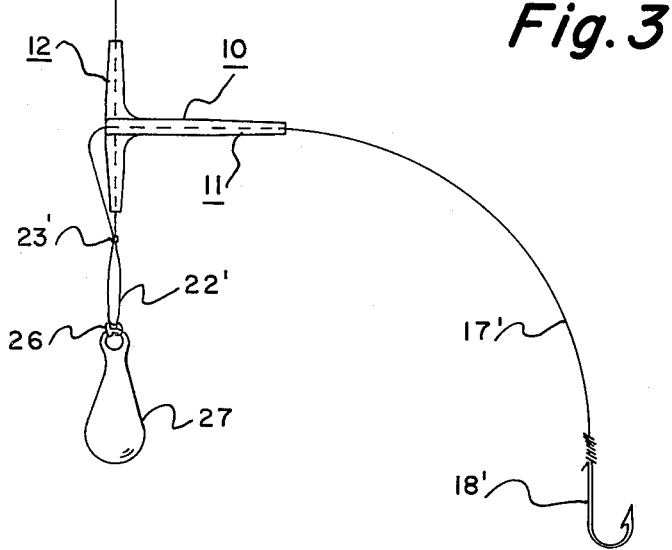

FISHHOOK LEADER STANDOFF

The present application is a continuation in part of application Ser. No. 334,722, filed Feb. 22, 1973 and now abandoned.

BACKGROUND OF INVENTION

The present invention is concerned with fishing equipment and, more specifically, to a standoff for use with a fishhook and associated leader for positioning the fishhook in use.

It is generally desirable in a fishing rig that the hook and associated bait be held in a generally horizontal position rather than in a vertical position inasmuch as the horizontal position appears more natural. Additionally, the horizontally disposed hook has less tendency to become entangled with the main fishing line. This is particularly true where bottom fishing is involved.

It is also desirable in fishing rigs that a series of vertically spaced fishhook-leader combinations be employed. In such a rigging as this, it is all the more important that the hooks and leader be maintained in a horizontal position to avoid entanglement.

Various leader and spreader combinations have been proposed to accomplish the horizontal positioning of the fishhook and associated leader. These prior devices are, relatively speaking, rather complicated in that they employ separate leader lines, swivels, buckles, etc. in attaching to the fishhook and leader and the main fishing line. Additionally, when vertically stacked arrays are desired, it is necessary to use further separate interconnecting lines and clips to attach the leader carriers together. All of this leads to a more complicated and time consuming rigging of the equipment, more expensive equipment and generally a less productive rig.

OBJECT AND SUMMARY OF INVENTION

It is the object of the present invention to overcome the foregoing problems in respect to leader carriers by providing a simple, unitary and rugged construction leader standoff which will permit horizontal disposition of the hook and associated leader while permitting the utilization of a single leader with multiple standoffs for vertical arrays.

The standoff of the present invention accomplishes the foregoing object by a construction which includes a base member having a first axially extending passageway therethrough. A horizontally extending arm member is provided which is formed integrally with the base member at the juncture of one end of the arm member and the midpoint of the base member. The arm member further includes a second axial passageway through the arm member.

In use, the leader is passed through the arm member toward the juncture of the arm and base member and is tied off in a first loop. Thereafter, the leader is passed downwardly through the base member where it may be either tied off or extended to a second standoff. If the leader is extended to a second standoff, it is threaded downwardly through the base member and returned through the horizontal arm member to provide a second horizontally extending leader-hook combination.

The axis of the base member and arm member as well as the first and second passageways are nonintersecting. This arrangement permits ease in threading of the leader through the respective members.

Other objects and advantages of the present invention will become apparent to those skilled in the art from the detailed description thereof which follows taken in conjunction with the drawing.

DETAILED DESCRIPTION OF DRAWING

FIG. 1 is a perspective view of the standoff of the present invention;

FIG. 2 is a plan view of the standoff of the present invention; and

FIG. 3 is an elevation view of the standoff of the present invention rigged for multiple leader-hook combinations.

DETAILED DESCRIPTION OF INVENTION

The standoff of the present invention is shown in detail in FIGS. 1 and 2 of the drawing. The standoff 10 includes a horizontally extending arm member 11 and a vertically extending base member 12. The base member includes an upper portion 13 and a lower portion 14.

The base member 12 is formed integral with the horizontal arm 11. The arm 11 joins the base member 12 at one end of the arm 11 and the midpoint of the base member 12 between the upper and lower portions 13 and 14 thereof respectively. The arm member 11 is formed to one side of the midpoint of the base member 12 and thus the axes of both the vertical base member 12 and horizontal arm member 11 are nonintersecting for reasons to become hereinafter apparent.

A vertical passageway 16 is disposed through the entire axial length of the vertical base member 12. In a like manner, a similar axial passageway 15 extends throughout the entire length of the horizontal arm member 11. The vertical passageway 16 and horizontal passageway 15, like their respective base member and arm members, are nonintersecting.

In a preferred embodiment, the standoff is molded from a transparent nylon material. The vertical base member is approximately 2¼ inches in length while the arm member is likewise 2¼ inches in length.

The manner in which the standoff of the present invention can be used for a single rig is shown in FIG. 1. A fishhook 18 is first tied to one end of a long leader, preferably a monofilament leader. The opposite end of the leader is then passed through the horizontal arm member 11 toward the intersection of the arm with the base member. The leader is then pulled through the arm member 11 until the desired amount of leader is left extending from the arm member. Thereafter, the remaining portion of the leader 19 is formed into a loop knot 21 to provide a connecting loop 20. The remaining portion of the leader is then passed downwardly through the vertical passageway 16 and tied off at the opposite end of the passageway in a second loop knot 23. The resultant loop 22 may be used to attach a sinker or other weight for bottom fishing as desired.

The standoff of the present invention may also be utilized for a double rig as shown in FIG. 3. In this arrangement, the upper standoff is tied off in the same manner as that shown in FIG. 1 with the exception that an additional length of leader is provided. This additional portion of leader is then passed downwardly through the base member 12 of the second standoff, tied off in a further loop knot 23' and loop 22' respectively. The remaining portion of the leader is then passed in a reverse direction through the arm member 11 to form a second extending leader 17' for utilization with a second fishhook 18'.

As shown in FIG. 3, the double rig assembly is suspended on the main fishing line 25 by means of a clip 24 which is secured through the loop 20. In a like manner, a sinker 27 is secured to the bottom loop 22' by means of a tie off 26 made from the bottom loop 22'. The vertical spacing between the upper and lower standoff will be adjusted such that the distance between the two standoffs will at least equal or exceed the length of the leader extending from the arm 11.

From the foregoing description of a preferred embodiment of the present invention, it will be appreciated that the standoff of the present invention provides a quick, convenient and inexpensive standoff which utilizes a single leader for either single or double rig and which also maintains the fishhook and leader in a horizontal position.

The standoff of the present invention has been described in respect to a particular embodiment thereof shown in the drawing. It is to be understood that other variations and modifications will now become apparent to those skilled in the art and, accordingly, no limitation as to the scope of the invention was intended by the description thereof in respect to the particular embodiment disclosed.

I claim:

1. A fishing line standoff and leader combination for receiving and positioning a fishhook and immediately associated leader portion comprising:
   a vertically extending base member including a first axially extending passageway therethrough;
   a horizontally extending arm member formed integral with the base member at the juncture of one end of the arm member and substantially the midpoint of the base member, said arm member including a second axially extending passageway therethrough; and
   a leader threaded through the second passageway toward the midpoint of the base member, tied off in a loop and threaded downwardly through the first passageway to another tie off permitting the standoff to be vertically suspended while maintaining the fishhook and immediately associated leader portion in a horizontal position.

2. The standoff in claim 1 wherein the first and second passageways are nonintersecting to facilitate threading of the leader therethrough.

3. The standoff of claim 2 wherein the axis of the base member and arm member are nonintersecting.

4. The standoff of claim 1 wherein the standoff is formed of a transparent material.

5. A fishing line standoff for receiving and positioning a fishhook and associated leader comprising:
   a vertically extending base member including a first axially extending passageway therethrough; and
   a horizontally extending arm member formed integral with the base member at the juncture of one end of the arm member and substantially the midpoint of the base member, said arm member including a second axially extending passageway therethrough and disposed in nonintersecting relationship to the first passageway whereby the leader may be threaded through the second passageway toward the midpoint of the base member, tied off in a loop and threaded downwardly through the first passageway to another tie off permitting the standoff to be vertically suspended while maintaining the fishhook and immediately associated leader portion in a horizontal position.

* * * * *